(12) United States Patent
Cha et al.

(10) Patent No.: US 11,708,022 B2
(45) Date of Patent: Jul. 25, 2023

(54) SYSTEM AND METHOD OF CONTROLLING PATTERN SKIN LIGHTING DEVICE FOR VEHICLE

(71) Applicants: Hyundai Motor Company, Seoul (KR); Kia Motors Corporation, Seoul (KR)

(72) Inventors: Dong Eun Cha, Gyeonggi-do (KR); Jin Ho Hwang, Chungcheongnam-do (KR); Sang Heon Lee, Seoul (KR); Julliana Cho, Seoul (KR); Jin Seok Seo, Seoul (KR); Byoung Oh Choi, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 347 days.

(21) Appl. No.: 16/884,704

(22) Filed: May 27, 2020

(65) Prior Publication Data

US 2021/0129745 A1    May 6, 2021

(30) Foreign Application Priority Data

Nov. 4, 2019   (KR) .................. 10-2019-0139723

(51) Int. Cl.
| | |
|---|---|
| *B60Q 1/26* | (2006.01) |
| *H05B 45/44* | (2020.01) |
| *H05B 47/165* | (2020.01) |
| *H05B 47/155* | (2020.01) |

(52) U.S. Cl.
CPC .......... *B60Q 1/2642* (2013.01); *H05B 45/44* (2020.01); *H05B 47/155* (2020.01); *H05B 47/165* (2020.01); *B60Q 2400/40* (2013.01)

(58) Field of Classification Search
CPC .............. B60Q 1/2642; B60Q 2400/40; B60Q 1/2607; B60Q 1/0041; B60Q 1/0076; B60Q 1/2696; H05B 45/44; H05B 47/155; H05B 47/165; F21S 41/663; F21S 41/635
See application file for complete search history.

(56) References Cited

U.S. PATENT DOCUMENTS

| | | | | |
|---|---|---|---|---|
| 2016/0374167 | A1* | 12/2016 | Aliakseyeu | H05B 45/12 |
| 2018/0290584 | A1* | 10/2018 | Jung | B60Q 1/085 |
| 2020/0037407 | A1* | 1/2020 | Schulten | H05B 47/105 |

FOREIGN PATENT DOCUMENTS

| | | | | |
|---|---|---|---|---|
| DE | 102016109530 A1 * | 11/2017 | | F21S 41/135 |
| DE | 102016207725 A1 * | 11/2017 | | |
| DE | 102017105131 A1 * | 9/2018 | | H05B 33/0884 |

(Continued)

*Primary Examiner* — Renan Luque
(74) *Attorney, Agent, or Firm* — Fox Rothschild LLP (57) ABSTRACT

A method of controlling a pattern skin lighting device for a vehicle is provided. The method includes generating a plurality of random numbers and accumulating the number of continuous turn-on times for each lightening cell in an arrangement of the lightening cells configuring a pattern skin lighting device. Additionally, the method includes selecting a turn-on target lightening cell, lightening cells having an accumulative value of the number of continuous turn-on times that is a predetermined reference value or less, among the lightening cells corresponding to the generated random number, and turning on a light emitting element of the selected turn-on target lightening cell.

5 Claims, 10 Drawing Sheets

(56) References Cited

FOREIGN PATENT DOCUMENTS

| | | | |
|---|---|---|---|
| KR | 1020020022879 | A | 3/2002 |
| KR | 1020130085806 | A | 7/2013 |
| KR | 101361092 | B1 | 2/2014 |
| KR | 2015-0145294 | A | 12/2015 |
| KR | 1020170079297 | A | 7/2017 |
| KR | 1020170082670 | A | 7/2017 |
| KR | 1020190055953 | A | 5/2019 |

* cited by examiner

| N | M | CELL COVER DESIGNATION FACTOR | THE NUMBER OF SIMULTANEOUS TURN-ON | TURN-OFF COLUMN | MAX |
|---|---|---|---|---|---|
| 1 | -1 | 2 | 5 | -4 | 20 |
| 2 | 0 | 2 | 5 | -3 | 20 |
| 3 | 1 | 2 | 5 | -2 | 20 |
| 4 | 2 | 2 | 5 | -1 | 20 |
| 5 | 3 | 2 | 5 | 0 | 20 |
| 6 | 4 | 2 | 5 | 1 | 20 |
| 7 | 5 | 2 | 5 | 2 | 20 |
| 8 | 6 | 2 | 5 | 3 | 20 |
| 9 | 7 | 2 | 5 | 4 | 20 |
| 10 | 8 | 2 | 5 | 5 | 20 |
| 11 | 9 | 2 | 5 | 6 | 20 |
| 12 | 10 | 2 | 5 | 7 | 20 |
| 13 | 11 | 2 | 5 | 8 | 20 |
| 14 | 12 | 2 | 5 | 9 | 20 |
| 15 | 13 | 2 | 5 | 10 | 20 |
| 16 | 14 | 2 | 5 | 11 | 20 |
| 17 | 15 | 2 | 5 | 12 | 20 |
| 18 | 16 | 2 | 5 | 13 | 20 |
| 19 | 17 | 2 | 5 | 14 | 20 |
| 20 | 18 | 2 | 5 | 15 | 20 |
| 21 | 19 | 2 | 5 | 16 | 20 |
| 22 | 20 | 2 | 5 | 17 | 20 |
| 23 | 21 | 2 | 5 | 18 | 20 |
| 24 | 22 | 2 | 5 | 19 | 20 |
| 25 | 23 | 2 | 5 | 20 | 20 |

SYSTEM AND METHOD OF CONTROLLING PATTERN SKIN LIGHTING DEVICE FOR VEHICLE

CROSS REFERENCE TO RELATED APPLICATION

The present application claims priority of Korean Patent Application No. 10-2019-0139723 filed on Nov. 4, 2019, the entire contents of which is incorporated herein for all purposes by this reference.

BACKGROUND

Field of the Disclosure

The present disclosure relates to a lighting technology of a vehicle, and more particularly, a system and method of controlling a pattern skin lighting device for a vehicle.

Description of the Related Art

Recently, among the lamps of a vehicle, there are those which are intended to produce a differentiated lighting image from the conventional one by arranging a plurality of light sources such as light emitting diodes (LEDs) on one light emitting surface. The lighting devices as described above have a fixed lighting output form by turning on and off a light source such as the LED.

In the development autonomous vehicles, different spaces within the vehicle will be able to be connected and controlled variably and actively, and various functions, and connection methods, and the like of the vehicle thus need to be devised for this purpose. Various lamp devices mounted to generate light within a vehicle may implement more various lighting output forms, thereby helping to meet such demands.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides a system and method for operating a pattern skin lighting device for a vehicle, which may actively implement more various lighting output forms to generate a lighting pattern image of a design which is aesthetically elegant to the vehicle, and furthermore, may express various messages.

A method of controlling a pattern skin lighting device for a vehicle according to the present disclosure may include generating, by a controller, a plurality of random numbers; accumulating, by the controller, the number of continuous turn-on times for each lightening cell in the arrangement of the lightening cells configuring a pattern skin lighting device for a vehicle; selecting, as a turn-on target lightening cell, lightening cells with an accumulative value of the number of continuous turn-on times that is a predetermined reference value or less, among the lightening cells corresponding to the generated random number; and turning on a light emitting element of the selected turn-on target lightening cell.

The controller may be configured to generate the number of random numbers to be less than the number of entire lightening cell of the pattern skin lighting device within a predetermined number range. The controller may be configured to set the reference value within a range of a natural number greater than 1. The method further include driving, by the controller, a cell cover of the selected turn-on target lightening cell. In particular, the controller may be configured to drive the light emitting element and the cell cover of the selected turn-on target lightening cell during a predetermined reference time, and all steps from the generating of the random number may be repeated.

The lightening cell having the accumulative value of the number of continuous turn-on times exceeding the reference value among the lightening cells corresponding to the generated random number may be excluded from the turn-on target lightening cell, and the accumulative value of the number of continuous turn-on times of the lightening cell excluded from the turn-on target lightening cell may be initialized to zero.

In addition, a method of controlling a pattern skin lighting device for a vehicle according to the present disclosure may include determining, by a controller, a mode to drive a pattern skin lighting device for a vehicle according to a vehicle operating state and a vehicle nearby situation; selecting, by the controller, scenario data for the corresponding mode according to the determined mode for driving the pattern skin lighting device; and operating, by the controller, a light emitting element of each lightening cell of the pattern skin lighting device based on the selected scenario data.

The controller may be configured to control a cell cover of each lightening cell of the pattern skin lighting device together according to the selected scenario data. The vehicle operating state may include at least one of an idle state, a turn signal operating state, a warning switch on state, a charge state, and a vehicle off switch operating state of the vehicle. The vehicle nearby situation may include at least one of a situation in which a welcome function is required to be implemented due to detecting that a user approaches the vehicle, and a situation in which a pedestrian passes nearby the vehicle.

A method of controlling a pattern skin lighting device for a vehicle may further include turning on, by a controller, light emitting elements of lightening cells configuring a predetermined N column, in the arrangement of the lightening cells configuring a pattern skin lighting device for a vehicle; and repeating, by the controller, increasing the N by one each time a predetermined turn-on interval elapses and turning on the light emitting elements of the lightening cells configuring the N columns. The controller may be configured to set the predetermined number of simultaneous turn-on, and turn off turn-off columns corresponding to the number of N simultaneous turn-on, thereby securing a state where only as many columns as the number of simultaneous turn-on have been turned on simultaneously.

The method may further include driving, by the controller, the cell covers of the lightening cells of a column requiring the driving of the cell covers among the lightening cells in which the light emitting elements have been turned on. The controller may be configured to interlock the driving of the cell covers of the lightening cells to the N column which is a column of the lightening cells turning on the new light emitting elements. The controller may be configured to set a predetermined cell cover designation factor, and drive cell covers of lightening cells of an M column which is a column obtained by subtracting as many as the cell cover designation factor from the N column which is the column of the lightening cells newly turned on.

The controller may be configured to repeat turning on the light emitting elements of the lightening cells configuring the N column while increasing the N by one until reaching MAX which is a predetermined maximum value. When the N is greater than the MAX, the columns remaining as the turned-on state may be configured to be turned off sequentially from the earlier turned on column at a predetermined turn-off interval.

The present disclosure may actively implement more various lighting output forms outside the vehicle body of the vehicle, thereby forming the lighting pattern image of the design which improves the appearance of the vehicle.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Referring to FIGS. 1 to 4, a pattern skin lighting device 100 for a vehicle to which the present disclosure may be applied is a configuration in which lightening cells 1 configured as described later may be arranged in a plane while forming a regular pattern. Each of the lightening cells 1 may include a light emitting element 3; a cell pocket 5 that surrounds the light emitting element 3; a cell cover 7 that surrounds the light emitting element 3 inside the cell pocket 5, and rotatably installed with respect to the cell pocket 5; and an actuator 9 configured to rotate the cell cover 7 with respect to the cell pocket 5.

In other words, each of the lightening cells 1 configuring the pattern skin lighting device 100 according to the present disclosure may be configured so that the light rays generated from the light emitting element 3 installed inside the cell pocket 5 may be varied by adjusting the light emitting element 3 and the lighting state expressed to the outside according to the rotating state of the cell cover 7 may be varied, and may be configured to separately adjust the light ray radiation state of each of the lightening cells 1, respectively, thereby implementing the lighting state of a so called STAR CLOUD image. A lighting state may also be varied in any form, thereby forming the lighting pattern image of the design providing an improved aesthetical appearance of the vehicle. For reference, the STAR CLOUD image refers to an image in which local bright and dark portions are likely to be mixed together such as the nebula of the universe. The light emitting element 3 may be configured as an LED or the like.

Figure 2:
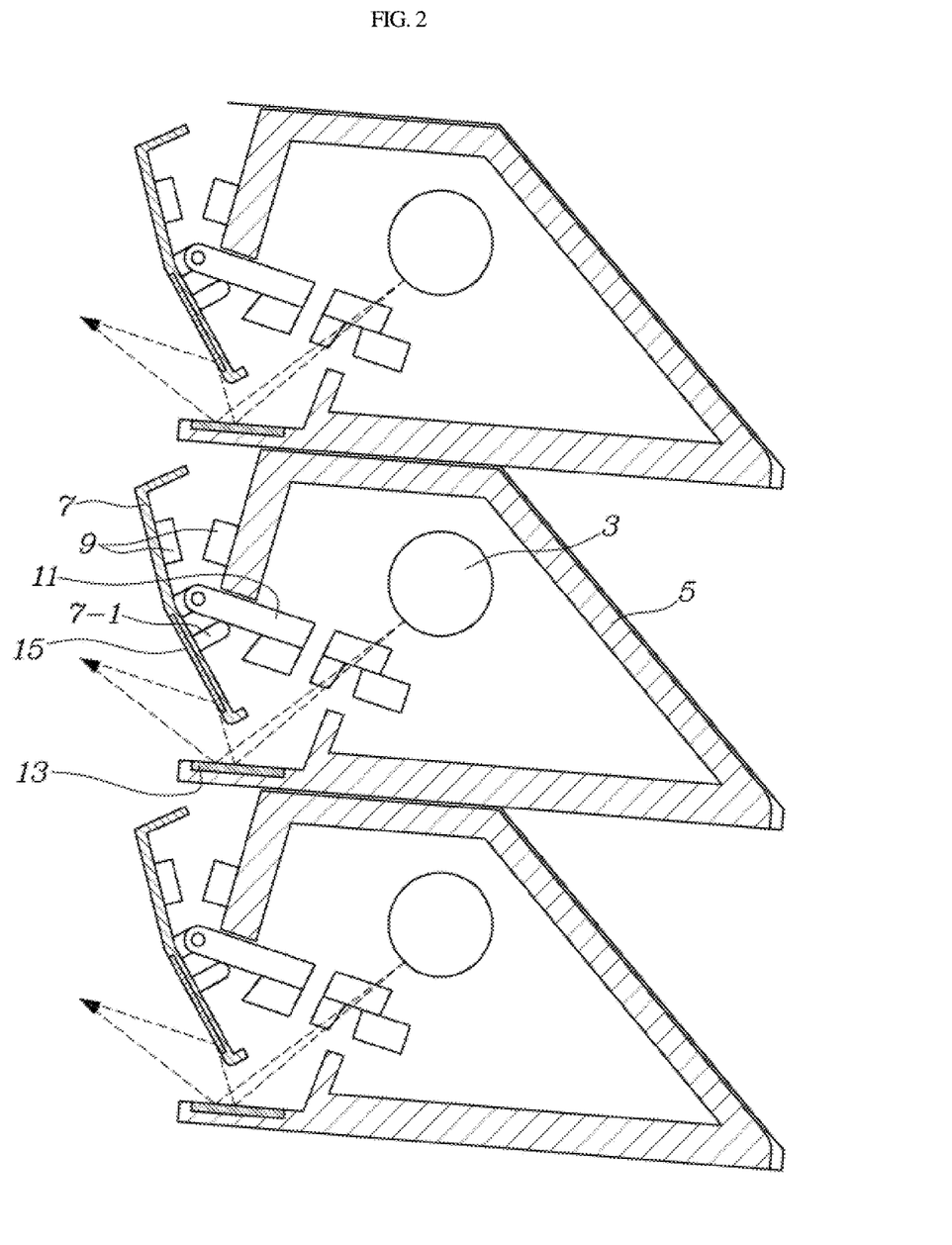
FIG. 2 is a diagram illustrating a section structure of a lightening cell configuring the pattern skin lighting device of FIG. 1 according to an exemplary embodiment of the present disclosure.
Figure 3:
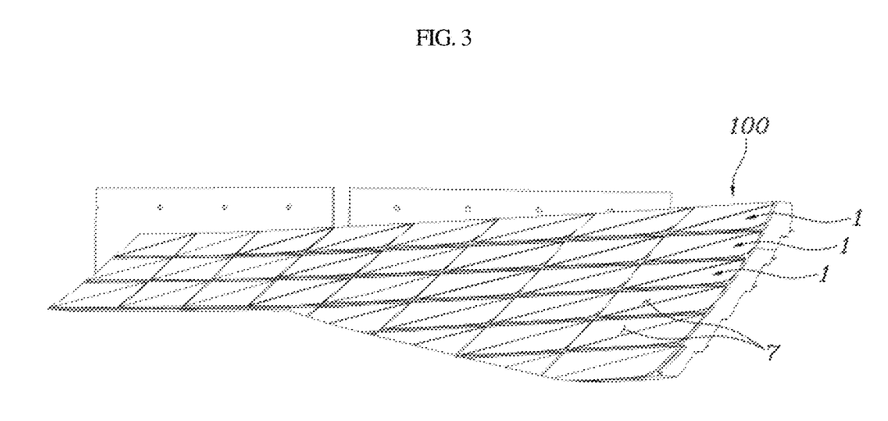
FIG. 3 is a diagram showing a state where a cell cover of each lightening cell has been rotated at different angles in view of FIG. 1 according to an exemplary embodiment of the present disclosure.
Figure 4:
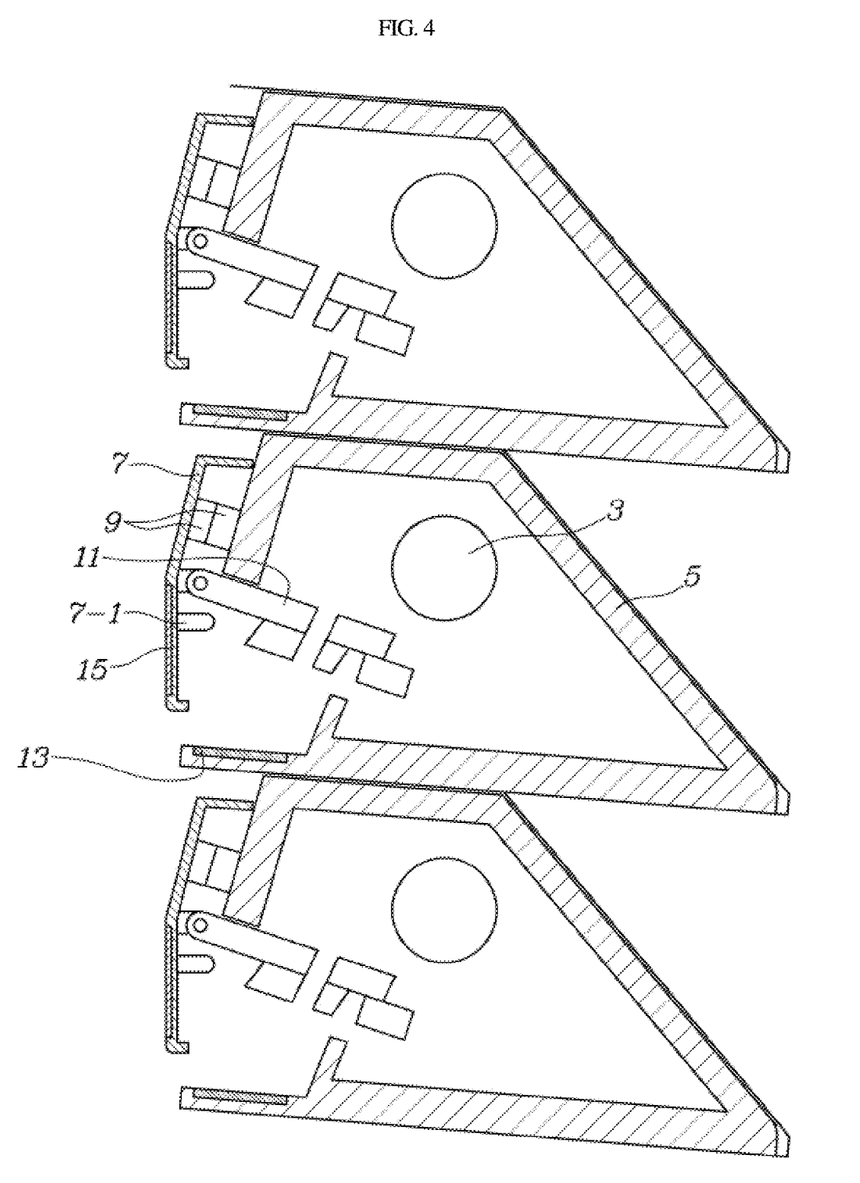
FIG. 4 is a diagram illustrating a section structure of the lightening cell of the state of FIG. 3 according to an exemplary embodiment of the present disclosure.

The cell cover 7 may be installed to be rotatable with respect to the cell pocket 5 within a predetermined range. A cell link 11 may be connected to the inside of the cell cover 7 to be relatively rotatable, and the cell link 11 may be installed to be linearly slidable within a predetermined range in a direction from the cell pocket 5 toward the cell cover 7. Accordingly, the cell link 11 may adjust a position of the cell cover 7 with respect to the cell pocket 5 in a state where the cell cover 7 may be rotated with respect to the cell pocket 5.

Accordingly, a predetermined range in which the cell link 11 is linearly slidable in the cell pocket 5 may set to the level necessary for adjusting the relative position of the cell cover 7 with respect to the cell pocket 5 every each lightening cell to secure a smoother rotating operation of the cell cover 7 as described above. For reference, in FIG. 2, the end portion of the cell pocket 5 side of the cell link 11 or the like may include a stop protrusion not shown or similar component for the cell link 11 to limit a range which is linearly slidable with respect to the cell pocket 5.

The cell cover 7 is rotated by using, as a rotating axis, a site connected to the cell link 11 to be relatively rotatable, and the predetermined range in which the cell cover 7 is rotatable with respect to the cell pocket 5 may be set by an angle limiting protrusion 7-1 that extends toward the cell link 11 from the inside of the cell cover 7. As shown in FIG. 2, the cell cover 7 may be installed to allow the light rays from the light emitting element 3 to pass through only a gap formed between one side end portion of the cell cover 7 (e.g., a first side end portion) and the cell pocket 5. In other words, the light rays generated from the light emitting element 3 may not be directly radiated to the outside by the cell pocket 5 and the cell cover 7 surrounding the light emitting element 3 as shown, and may be radiated to the outside only through the gap formed between the cell pocket 5 and the cell cover 7 as described above.

The cell pocket 5 may include a first mirror 13 which allows the light rays proceeding to the gap between the cell cover 7 and the cell pocket 5 from the light emitting element 3 to be reflected and discharged to the outside of the lightening cell 1. In addition, the cell cover 7 may include a second mirror 15 which allows the light rays reflected through the first mirror 13 to be reflected again and discharged to the outside of the lightening cell 1. The outer surface of the cell cover 7 may be formed in a shape in which at least two or more planes meet or intersect each other at a regular angle.

In FIG. 2, the outer surface of the cell cover 7 may be formed in a shape in which two planes meet or intersect each other at a regular angle at a position adjacent to the rotation axis of the cell cover 7, and the second mirror 15 may be disposed on the surface of the plane, which is adjacent to the gap with the cell pocket 5, of two planes outside the cell cover 7. Accordingly, the lighting image exposed to the outside of the lightening cell 1 may be varied by adjusting the brightness of the light emitting element 3 inside the lightening cell 1, but may form various lighting states varied continuously by adjusting the amounts and angles of the light rays reflected through the first mirror 13 and the second mirror 15 based on the rotation angle of the cell cover 7, and provide the gradation lighting effect to the outside of the cell cover 7.

Figure 1:
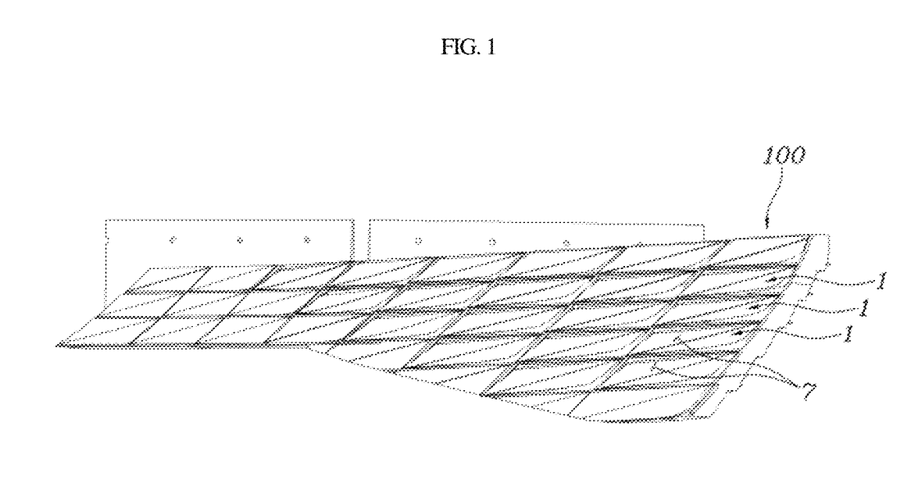
FIG. 1 is a diagram showing a pattern skin lighting device for a vehicle according to an exemplary embodiment of the present disclosure.

For reference, FIG. 1 shows a state where the appearance of each cell cover 7 has been formed in a rhombus shape, and the cell cover 7 has been installed to be rotatable around a longest one of the diagonals of the rhombus. Meanwhile, the actuator 9 may be configured to include an electromagnet installed to vary a magnetic force acting between the cell cover 7 and the cell pocket 5.

The electromagnets may be disposed on both the cell cover 7 and the cell pocket 5 to adjust the rotation angle of the cell cover 7 with respect to the cell pocket 5 by adjusting the strengths and directions of the magnetic force of two electromagnets. Alternatively, only one side (e.g., a first side) of the cell cover 7 and the cell pocket 5 may include the electromagnet and a permanent magnet capable of reacting to the magnetic force of the electromagnet may be provided at the opposite side thereof (e.g., a second side) to adjust the electromagnet at the first side thereof to thus adjust the rotation angle of the cell cover 7. In addition, the actuator 9 may include various devices for forming the linear displacement or the rotational displacement to form the rotation angle of the cell cover 7 with respect to the cell pocket 5.

As described above, the pattern skin lighting device 100 for the vehicle to which the present disclosure may be applied may install each lightening cell 1 configured as described above to the outside of the vehicle body and may be arranged to in plane while forming a regular pattern as described above, and individually may adjust the entire lightening cells arranged as described above in a controller, respectively, thereby changing various lighting images on the exterior of the vehicle body in real time.

Figure 5:
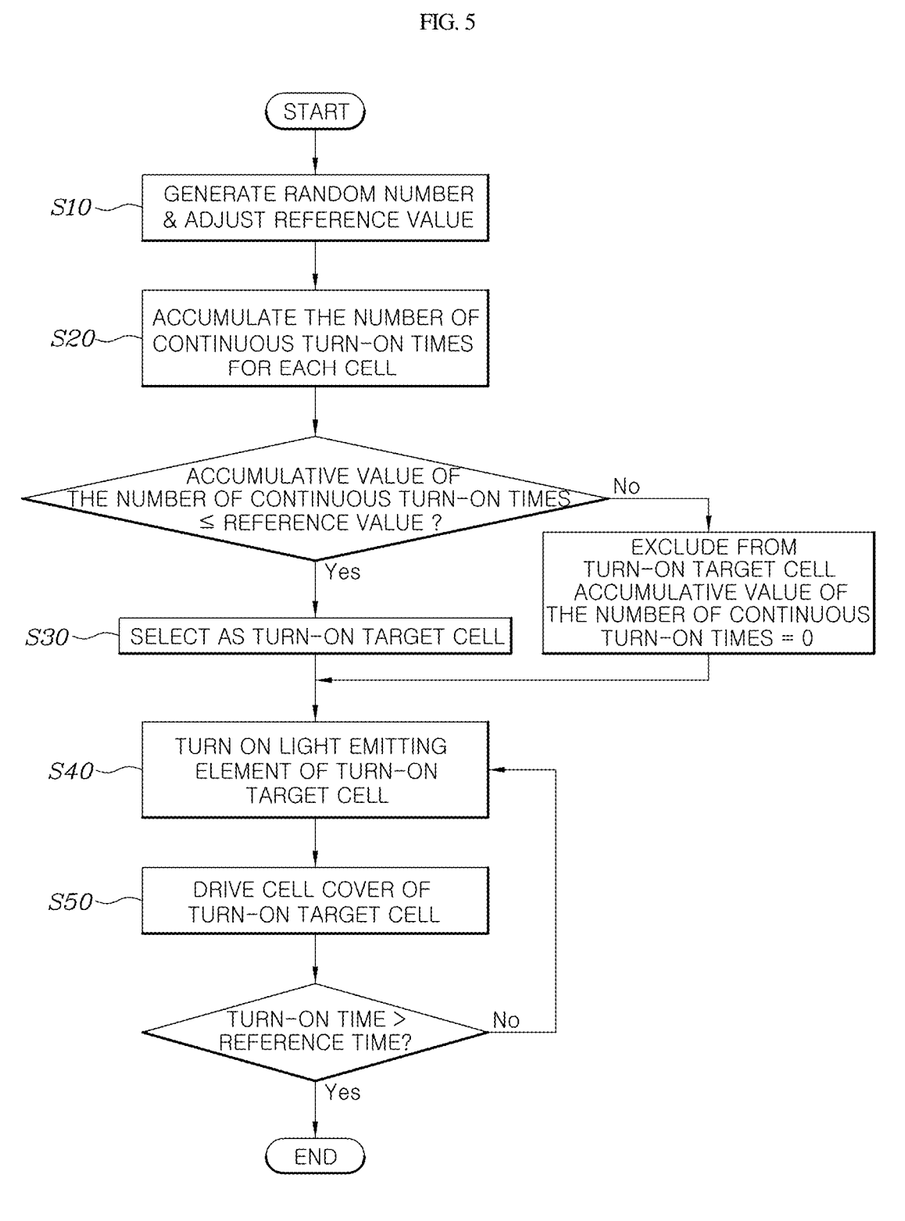
FIG. 5 is a flowchart illustrating a first embodiment of a method of controlling the pattern skin lighting device for the vehicle according to an exemplary embodiment of the present disclosure.

FIG. 5 is a diagram showing an exemplary embodiment of operating the pattern skin lighting device for the vehicle as described above according to the present disclosure, and the method may include generating, by the controller, a plurality of random numbers (S10); accumulating, by the controller, the number of continuous turn-on times for each lightening cell in the arrangement of the lightening cells configuring the pattern skin lighting device for the vehicle (S20); selecting, as a turn-on target lightening cell, the lightening cells in which an accumulative value of the number of continuous turn-on times is a predetermined reference value or less among the lightening cells corresponding to the generated random number (S30); and turning on the light emitting element of the selected turn-on target lightening cell (S40). In other words, the present embodiment may allow the controller to randomly flash the respective lightening cells arranged in the pattern skin lighting device by the generated random number, thereby producing the STAR CLOUD image such as the stars shining in the night sky.

Figure 6:
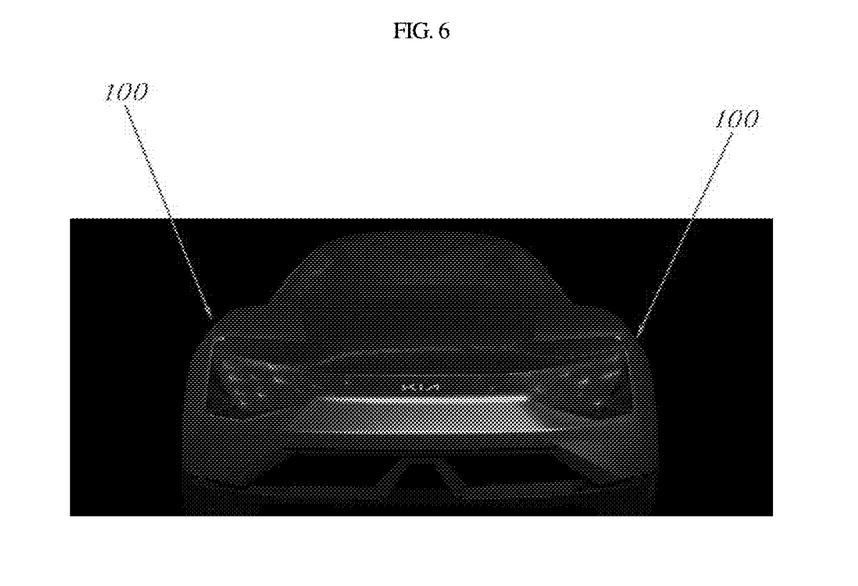
FIG. 6 is a diagram exemplifying a state where the pattern skin lighting device for the vehicle has implemented a STAR CLOUD image according to an exemplary embodiment of FIG. 5.

For reference, FIG. 6 shows one scene producing the STAR CLOUD image as described above, and the shining portion may be randomly changed over time. The controller may be configured to generate the number of random numbers that is less than the number of entire lightening cell of the pattern skin lighting device within a predetermined number range. In other words, if the number of entire lightening cell of the pattern skin lighting device is, for example, 50, the number of random numbers generated, by the controller, in the S10 of FIG. 5 may be 10, 20, or the like less than 50. Additionally, for example, if a unique number is assigned to the entire lightening cell sequentially from 1 to 50, a range of the generated random number may be limited to 1 to 50, such that the random number generated as described above may refer to one lightening cell, respectively.

Accordingly, when the random number is generated by the controller as described above, the accumulating of the number of continuous turn-on times for each lightening cell increases the number of continuous turn-on times of the lightening cell corresponding to the generated random number by one.

Accordingly, the controller may be configured to select the corresponding lightening cell as the turn-on target lightening cell when the number of continuous turn-on times thus increased is the reference value or less by comparing the number of continuous turn-on times thus increased with the reference value to thus turn on this lightening cell.

For example, when the number of continuous turn-on times of a fifth lightening cell is 2, the number of continuous turn-on times of a seventh lightening cell is 1, and the number of continuous turn-on times of a thirteenth lightening cell is 0, which have been accumulated up to the present. If the random numbers are generated as 5, 7, 13, the number of continuous turn-on times of the fifth lightening cell is 3, the number of continuous turn-on times of the seventh lightening cell is 2, and the number of continuous turn-on times of the thirteenth lightening cell is 1.

Additionally, if the reference value is set to 2, the seventh and thirteenth lightening cells have the number of continuous turn-on times less than the reference value which is 2 to be selected as the turn-on target lightening cell and turned on in this cycle. However, since the number of continuous turn-on times of the fifth lightening cell is 3 and greater than the reference value which is 2, the fifth lightening cell may be excluded from the turn-on target lightening cell. The controller may be configured to set the reference value within a range of a natural number greater than 1, and may be configured to adjust the reference value so that the corresponding lightening cell may be repeatedly turned on in a range of at least once.

As described above, among the lightening cells corresponding to the generated random number, the lightening cell whose accumulative value of the number of continuous turn-on times exceeds the reference value may be excluded from the turn-on target lightening cell, and the accumulative value of the number of continuous turn-on times of the lightening cell excluded from the turn-on target lightening cell may be initialized to zero.

Meanwhile, the present exemplary embodiment may further include driving, by the controller, the cell cover of the selected turn-on target lightning cell (S50). By driving the cell cover of the lightening cell turned on as described above, it may be possible to express the appearance in which the starlight is likely to be shining more similarly. The controller may be configured to operate the light emitting element and the cell cover of the selected turn-on target lightening cell during a predetermined reference time, and repeatedly perform all the steps from generating of the random number.

The reference time may be a time for maintaining a state where the lightening cell has been turned on, and may be appropriately selected within a few seconds, and the controller may also be configured to vary the reference time every cycle. In addition, the controller may implement the STAR CLOUD image during a predetermined production time such as about 30 seconds, 1 minute, or 5 minutes while repeating the steps as described above, and then may be configured to gradually reduce the number of lightening cells to be turned on, thereby terminating the production of the STAR CLOUD image.

Accordingly, when the controller intends to terminate the production of the STAR CLOUD image, the controller may be configured to exclude the lightening cell having an accumulative value of the number of continuous turn-on times that exceeds the reference value from the turn-on target lightening cell, and also omit to initialize the accumulative value of the number of continuous turn-on times of the lightening cell excluded from the turn-on target lightening cell to zero, thereby gradually reducing the number of the lightening cells to be turned on and ultimately implementing the overall turn-off state. In addition, the controller may finally implement the completely turned-off state while reducing the number of lightening cells which are gradually turned on as described above even by a reduction in the number of random numbers gradually generated in the generating of the random number.

Figure 7:
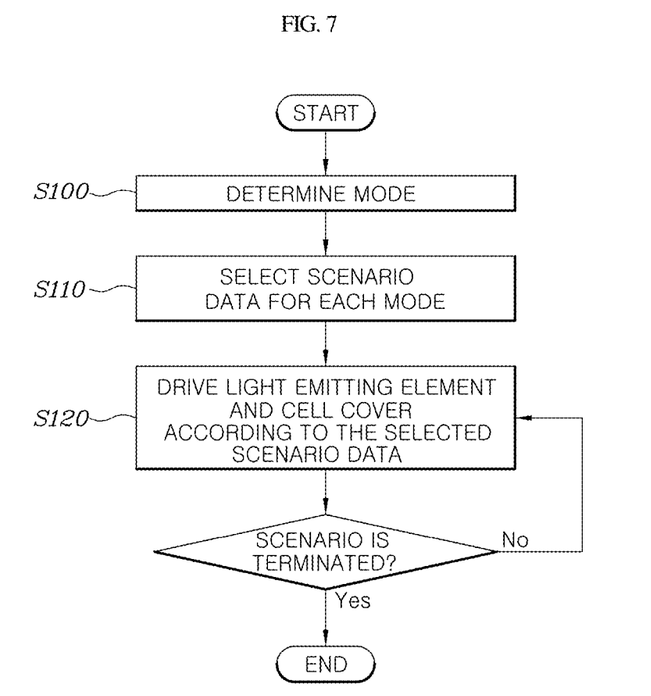
FIG. 7 is a flowchart illustrating a method of controlling the pattern skin lighting device for the vehicle according to a second exemplary embodiment of the present disclosure.

FIG. 7 shows a second exemplary embodiment of a method of controlling the pattern skin lighting device for the vehicle according to the present disclosure, and the method may include determining, by the controller, a mode to drive the pattern skin lighting device for the vehicle according to a vehicle operating state and a vehicle nearby situation (S100); selecting, by the controller, scenario data for the corresponding mode based on the determined mode to drive the pattern skin lighting device (S110); and operating, by the controller, the light emitting element of each lightening cell of the pattern skin lighting device based on the selected scenario data (S120).

In other words, the present exemplary embodiment configures the scenario data capable of implementing the flow of a series of lighting states to be produced through the pattern skin lighting device for the vehicle for each mode, and the method may include selecting, by the controller, the scenario data corresponding to a mode determined as be suitable for the current situation with being embedded in a separate memory device or controller, thereby operating the pattern skin lighting device for the vehicle according to the selected scenario data.

The vehicle operating state may include at least one of an idle state, a turn signal operating state, a warning switch on state, a charge state, and a vehicle off switch operation state of the vehicle. In other words, the controller may be configured to determine whether the vehicle is in the idle state with the operating state such as an accelerator pedal or an engine of the vehicle, and determine the mode based on the vehicle operating state as an idle mode, a turn signal mode, a warning mode, a charge mode, a vehicle off mode, or the like by sensing whether a driver has operated a turn signal switch, whether the driver has operated a warning switch, whether the vehicle is charging, and whether the driver has turned off a start-up switch of the vehicle.

In addition, the vehicle nearby situation may include at least one of a situation in which a welcome function is required to be implemented in response to detecting that the user is approaching the vehicle from the outside of the vehicle, and a situation in which a pedestrian passes nearby or in the vicinity of the vehicle (e.g., within a predetermined distance around the vehicle). In other words, the controller may be configured to determine a welcome mode by sensing the approach of the user with a smart key or key fob of the vehicle, and determine a pedestrian guide mode by sensing a pedestrian passing nearby the vehicle with a camera or other imaging device. Of course, the controller may be configured to determine the welcome mode by sensing the user's approach with a smartphone, other Near Field Communication (NFC) devices, or the like possessed by the user other than the smart key, and determine the pedestrian guide mode by sensing the pedestrian passing nearby the vehicle through various sensors such as an ultrasonic sensor other than the camera.

Figure 8:
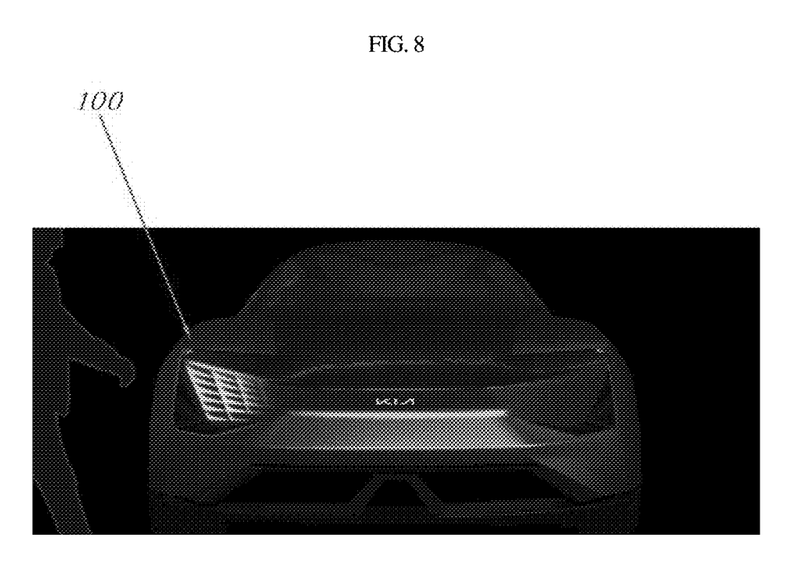
FIG. 8 is a diagram exemplifying one scene of a scenario set for the pattern skin lighting device for the vehicle to produce a situation where a pedestrian passes nearby the vehicle according to an exemplary embodiment of FIG. 7.

Scenario data for each mode may be configured in a form which may express intuition, beauty, and luxury. For example, FIG. 8 shows one scene of a scenario in which the pattern skin lighting device for the vehicle is driven according to the pedestrian guide mode, which may be configured as the scenario in which the turned-on portion as described above moves gradually and continuously along the moving direction of the pedestrian. At this time, the controller may be configured to operate the cell cover of each lightening cell of the pattern skin lighting device together according to the selected scenario data, thereby implementing a more elegant and beautiful lighting image (e.g., improving lighting aesthetics).

Figure 9:
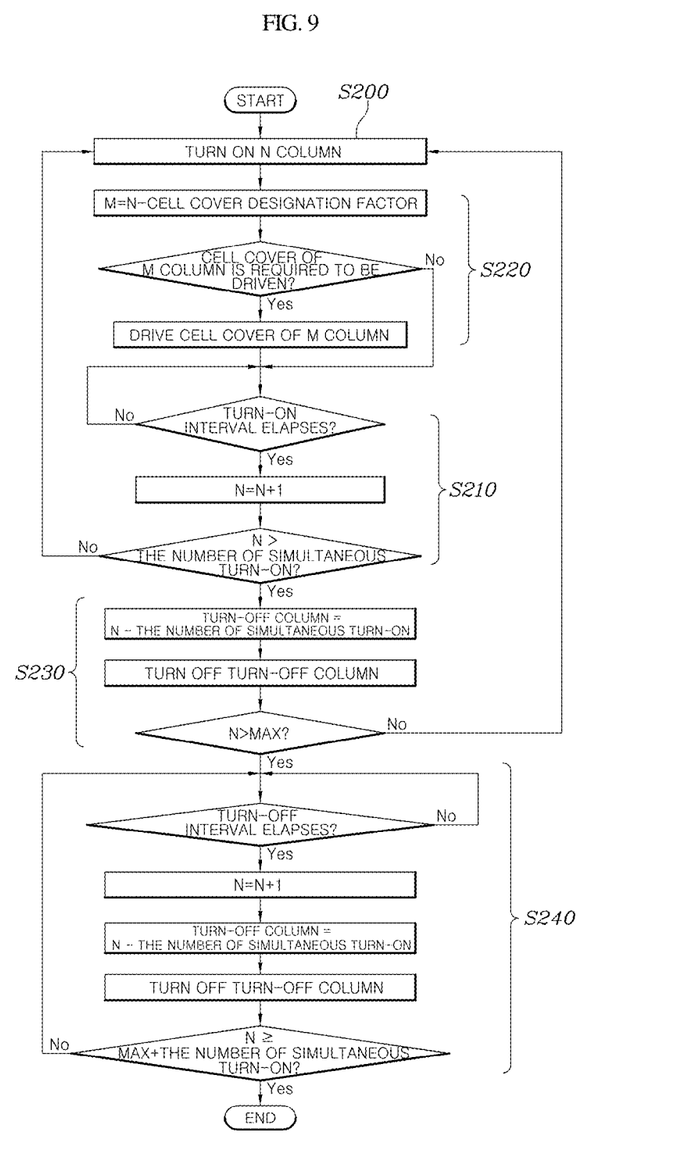
FIG. 9 is a flowchart illustrating a method of controlling the pattern skin lighting device for the vehicle according to a third exemplary embodiment of the present disclosure.

FIG. 9 is a flowchart showing a third exemplary embodiment of a method of operating the pattern skin lighting device for the vehicle according to the present disclosure, and the method may include turning on, by the controller, the light emitting element of the lightening cells configuring a predetermined N column in the arrangement of the lightening cells configuring the pattern skin lighting device for the vehicle (S200); and repeating, by the controller, increasing the N by one each time a predetermined turn-on interval elapses and the turning-on of the light emitting element of the lightening cells configuring the N columns (S210).

In other words, the present exemplary embodiment may produce a scenario similar to the above pedestrian guide mode, and for example, when the arrangement of the lightening cells has a column number increasing from left to right, it may be possible to implement that from the left columns to the right columns are turned on gradually and sequentially. In other words, when the leftmost column is referred to as a first column and the N starts at 1, the right columns may be turned on gradually and sequentially from the leftmost column each time the turn-on interval elapses.

Accordingly, the turn-on interval is a time until the adjacent column is turned on after the current column is turned on, and may be appropriately varied by the controller, and for example, may be set to about 0.5 seconds, 1 second, or the like. The controller may be configured to set the predetermined number of simultaneous turn-on, and turn off turn-off columns corresponding to the number of N simultaneous turn-on, thereby securing a state where as many columns as the number of simultaneous turn-on have been turned on simultaneously (S230).

Figure 10:
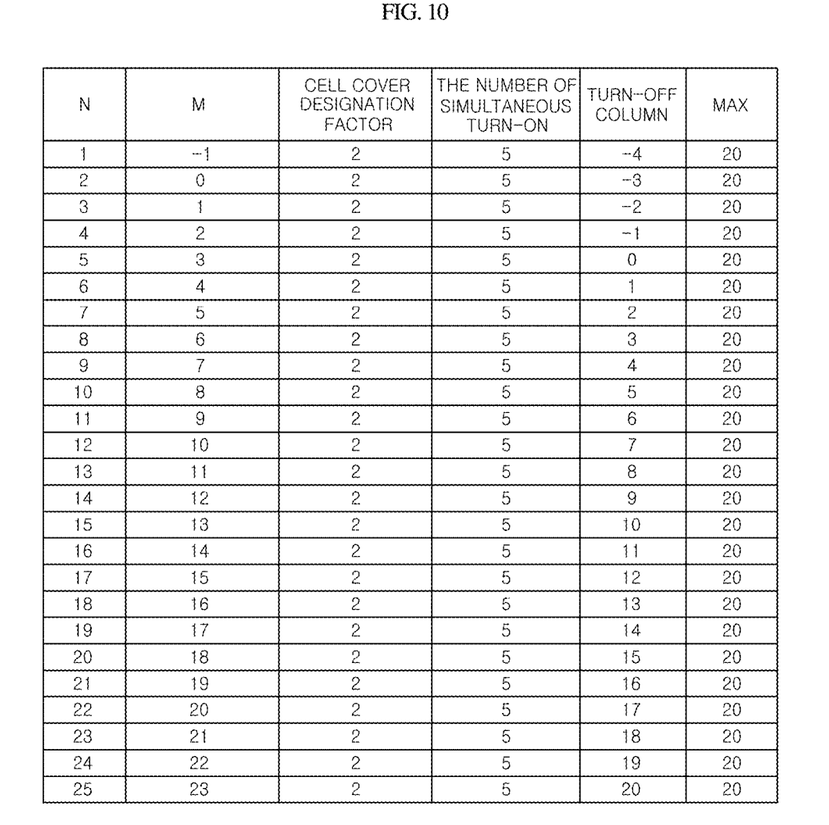
FIG. 10 is a graph illustrating an operation example of FIG. 9 according to an exemplary embodiment of the present disclosure.

FIG. 10 shows an example of the operation of the present exemplary embodiment each time the N is increased by one, and may produce the appearance in which since the number of simultaneous turn-on is 5, when turned on from the first column, the first column is turned off as the turn-off column when a sixth column is turned on, and thus, second to sixth columns may be turned on, and then in a next cycle, third to seventh columns may be turned on. Thus providing a state where only a total of five continuous columns have been turned on gradually moves from the left to the right over time.

The controller may be configured to disregard a case where the calculated turn-off column becomes a negative value. In addition, when the controller sets the number of simultaneous turn-on to MAX, which is a total number of columns to be adjusted, all the columns may be turned on sequentially without turning off any column until the column lastly turned on is turned on substantially (e.g., a to a maximum).

The present exemplary embodiment may further include driving, by the controller, the cell cover of the lightening cells of the column requiring the driving of the cell cover among the lightening cells in which the light emitting element has been turned on (S220). The controller may be configured to link the driving of the cell cover of the lightening cells to an N column which is a column of lightening cells turning on new light emitting elements.

In other words, the controller may be configured to select a predetermined cell cover designation factor, and drive the cell cover of the lightening cells of an M column which is a column obtained by subtracting as many as the cell cover designation factor from the N column which is a column of the lightening cells newly turned on. For example, in the operation as in FIG. 10, when turning on from the first column of the left, when the third column is turned on, the cell cover designation factor is 2, and thus, the M column becomes 1 and thus the cell cover of the first column may be driven or operated.

The cell cover designation factor may be varied arbitrarily by the controller, thereby producing more various effects. In addition, even when the M column is calculated as described above, whether the controller drives the cell cover may be determined by determining whether the cell cover requires operation. The controller may be configured to repeat the turning on of the light emitting element of the lightening cells configuring the N column while increasing the N by one (S200) until the MAX is reached which is the predetermined maximum value. For reference, in the example of FIG. 10, the MAX is set to 20, and a total of 20 columns may be adjusted.

When the N is greater than the MAX, the columns remaining as the turned-on state may be turned off sequentially from the earlier turned on column at predetermined turn-off intervals (S240). In other words, in the example of FIG. 10, the N is 20 which is the MAX and thus, from the left to the twentieth column may be turned on, and the number of simultaneous turn-on is 5 and thus, from the first to fifteenth columns may be turned off. When the sixteenth to nineteenth columns have been turned on together, the columns may be turned off by one by calculating the turn-off column while increasing the N by one again every the turn-off interval and thus, this is repeated until all the columns are turned off sequentially. Of course, the turn-off interval may be set to the same value as the turn-on interval to thus turn off the remaining columns at the same speed as the speed previously turned off, and the turn-off interval may be set to a shorter time to be turned off more rapidly.

While a specific exemplary embodiment of the present disclosure has been shown and described, it will be apparent to those skilled in the art that the present disclosure may be variously improved and changed without departing from the technical spirit of the present disclosure provided by the following claims.

What is claimed is:

1. A method of controlling a pattern skin lighting device for a vehicle, comprising:
   generating, by a controller, a plurality of random numbers to be assigned to each lighting cell in an arrangement of lighting cells configuring a pattern skin lighting device for a vehicle;
   accumulating, by the controller, a number of continuous turn-on times for each lightening cell;
   selecting, by the controller, as a turn-on target lightening cell, lightening cells having an accumulative value of the number of continuous turn-on times that is a predetermined reference value or less, among the lightening cells corresponding to the generated random number; and turning on, by the controller, a light emitting element of the selected turn-on target lightening cell;

wherein the lightening cell having the accumulative value of the number of continuous turn-on times that exceeds the reference value among the lightening cells corresponding to the generated random number is excluded from the turn-on target lightening cell, and the accumulative value of the number of continuous turn-on times of the lightening cell excluded from the turn-on target lightening cell is initialized to zero.

2. The method according to claim 1, further comprising:

generating, by the controller, a number of random numbers less than the number of entire lightening cells of the pattern skin lighting device within a predetermined number range.

3. The method according to claim 1, further comprising:

setting, by the controller, the reference value within a range of a natural number greater than 1.

4. The method according to claim 1, further comprising:

driving, by the controller, a cell cover of the selected turn-on target lightening cell.

5. The method according to claim 4, further comprising:

operating, by the controller, the light emitting element and the cell cover of the selected turn-on target lightening cell only during a predetermined reference time, wherein all steps from the generating of the random number are repeatedly performed.

* * * * *